Sept. 11, 1962
I. STRAUSS
3,053,098
SWITCHING APPARATUS
Filed July 28, 1959
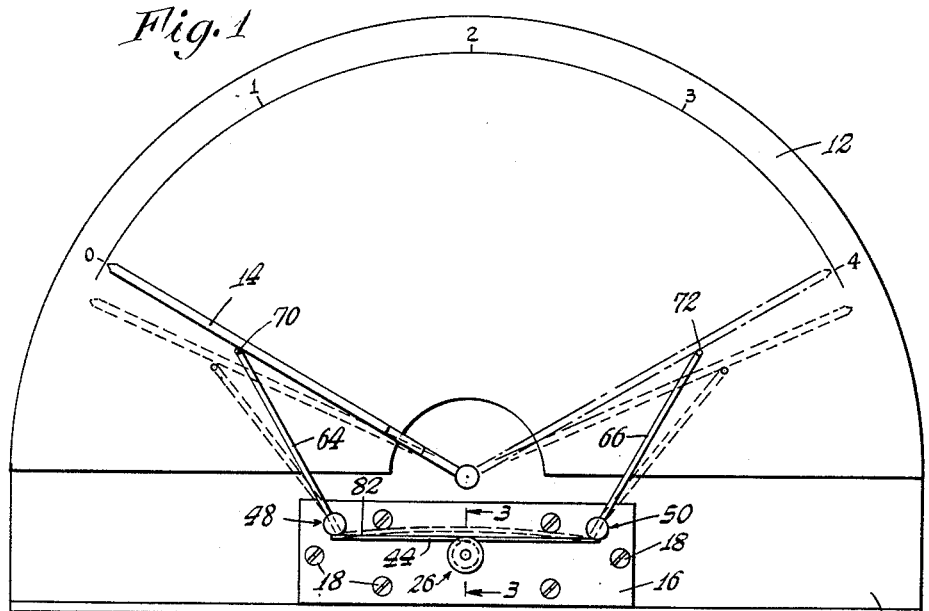
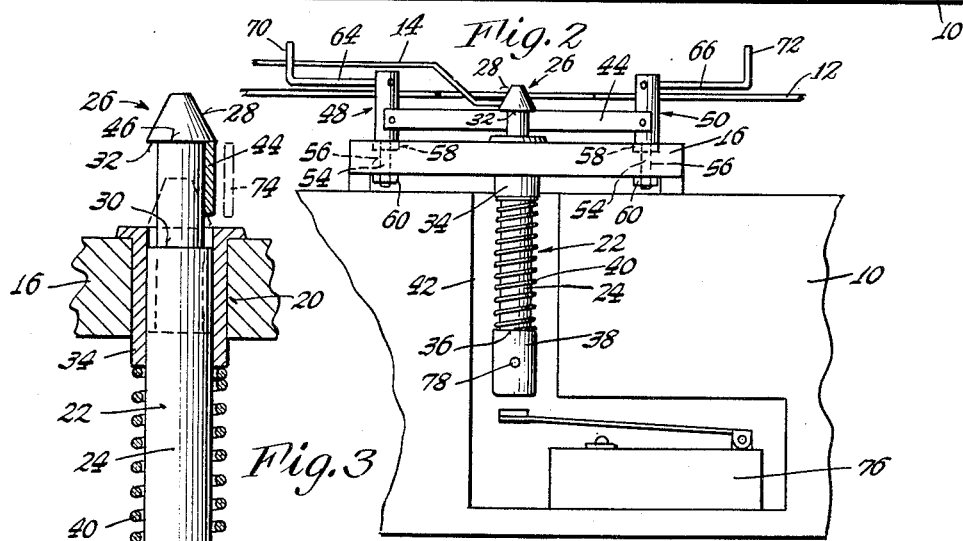
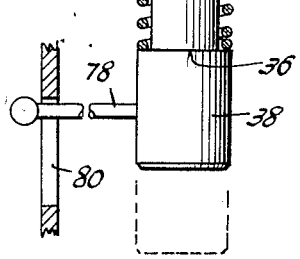
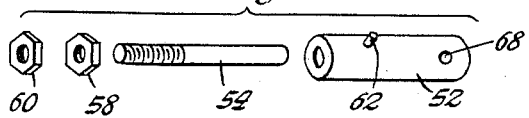
INVENTOR.
*Irving Strauss*
BY
*Munn, Liddy, Daniels & March*
ATTORNEYS United States Patent Office 3,053,098
Patented Sept. 11, 1962

3,053,098
SWITCHING APPARATUS
Irving Strauss, 446 Anson St., Bridgeport, Conn.
Filed July 28, 1959, Ser. No. 830,037
6 Claims. (Cl. 74—2)

This invention relates to switching apparatus and particularly to a switching device associable with meters or indicators operable in accordance with the fluctuations of the latter. This invention further relates to meters and indicators, and particularly to switch means combined therewith suitable for use in controllers.

An object of this invention is to provide a switch means associable with meters or indicators which can be utilized for electrical or mechanical control functions.

A further object of the invention is to provide a sensitive switch device operable to initiate mechanical or electrical secondary actions in accordance with the operation of meters or indicators or similar relatively delicate instruments or control elements.

More specifically an object of the invention is to provide switching means associable with the indicating pointer of a meter or indicating device operable in accordance with the position of said pointer which is capable of translating operation of said pointer into control functions for electrical or mechanical circuits or apparatus and which is sensitive, reliable and relatively inexpensive.

A further object of the invention is to provide an indicating switch mechanism which comprises a minimum of relatively movable parts and will maintain its alignment and sensitivity for extended periods of use.

A further object of the invention is to provide an apparatus as set forth above involving the minimum number of bearing points and other friction producing constructions.

A further object of the invention is to provide a meter actuated switch means which is positive in operation and has a sharply defined operation point.

A further object of the instant invention is to provide a switch structure which is readily adaptable to presently known meters and other instruments, and which will not alter the characteristics of the instrument to which it is adapted.

These and other objects and advantages will become apparent from the following description and the accompanying drawings wherein:

FIGURE 1 is a plan view of an instrument embodying the instant invention with some portions deleted to improve the illustration;

FIG. 2 is an elevatonal view of the apparatus illustrated in FIG. 1;

FIG. 3 is a fragmentary sectional view taken along line 3—3 of FIG. 1; and

FIG. 4 is an exploded view of a bearing structure employed.

Referring now particularly to the drawings:

In one embodiment, as illustrated in the accompanying drawings, the invention is employed in conjunction with a meter having a base 10, a scale 12, and a pointer 14. The pointer is connected to operating coils of the known type and the scale base and operating coils and pointer are supported within a case as is customary in the art. A switch support and bearing plate 16 is associated with the instrument as by attachment to the base 10 by screws 18. Plate 16 has a vertical aperture 20. An operating shaft 22 is vertically movably received within the aperture 20. The shaft 22 comprises a shank 24 and a head 26.

In the illustrated form, the shaft 22 is cylindrical in shape, and the head 26 is frusto-conical in shape. The frusto-conical shape provides a cam surface 28 for a purpose hereinafter described. However, it is apparent that the operating shaft 22 and the head 26 may take other shapes. The head 26 of the operating shaft is provided by undercutting the operating shaft as indicated at 30 and 32. Preferably the aperture 20 is provided with a bearing 34 which receives the operating shaft 22 and provides a smooth relatively frictionless contact therewith. The lower end of the operating shaft is provided with a shoulder 36. This can be accomplished by means of an attachment 38 attached to the lower end of the operating shaft or the shoulder can be formed integrally with the operating shaft. A compression spring 40 bears against the shoulder 36 and bearing 34. The latter transmits the spring load to the switch support and bearing plate 16. The spring 40 normally urges the shaft 22 vertically downwardly with respect to the plate 16.

The base 10 has an opening 42 in which is received the operating shaft 22 and spring 40.

The undercutting 30, 32, provides a recess in which is normally positioned a deflection release spring 44. The latter comprises a flat resilient band preferably of a metallic material which normally extends substantially in a single plane across the top of the support and bearing plate and beneath the head 26 where it engages the shoulder 46 provided by the undercutting 32. The deflection release spring 44 is connected at its ends, respectively, to lever bearings 48 and 50. These comprise cylindrically bored caps 52 and pins 54 as illustrated in FIGURE 4. The cylindrical caps are adapted to rotatably seat on the pins 54 and the latter extend through openings 56 in the plate 16. A pair of nuts 58 and 60 are used to secure the pins on the plate. A rivet 62 is used to secure the ends of the deflection release spring to the lever bearing caps. The lever bearing caps support lever arms 64 and 66, respectively. These are received in bores 68 in the caps.

The lever arms extend at an obtuse angle with respect to the deflection release spring and comprise rod-like members which extend outwardly over the scale 12. The rod-like members are turned up adjacent their ends to provide vertical legs 70 and 72. Each of the arms extends outwardly opposite from the other and the dimensioning of the arms and their inclination with respect to the normal position of the deflection release spring as well as the dimension of the other elements is adapted for the particular instrument so that the vertical legs will lie at desired points on the instrument face. In the embodiment illustrated these points represent the maximum and minimum desired deflections of the pointer 14.

When the pointer 14 swings either to its minimum or maximum desired reading it will engage one or the other of the vertical legs 70, 72 and upon continuing its movement beyond either of these points the arm will force the respective lever arms to move with it. This will rotate the corresponding cap 52 or 54. As a result, due to the fixed connection between the deflection release spring 44 and the cap, the release spring will distort as illustrated in FIGURE 1. The latter, as pointed out above, comprises a spring member formed of a spring steel, for example.

The spring is fixed at both ends of its effective length. Accordingly it will distort, bow, as illustrated when either cap 52 or 54 is rotated.

When the rotational movement is sufficient the distortion of the release spring will move it from is solid line position in FIGURE 3 to the dotted line position 74. This will be beyond the extremities of the shoulder 46 and the spring 40 will thereupon be free to move the shaft 22 downwardly in the bearing 34.

FIGURE 2 illustrates that a sensitive switch 76 can be positioned beneath the attachment 38 so that it will be operated when the shaft 22 moves downwardly under the influence of the spring 40. Through electrical means therefore a control function or other function can be initiated or effected. A rod 78 can be affixed to the attachment 38 and project outwardly of the instrument case through a slot 80 provided therein. This rod can be utilized to reset the switch. Resetting is achieved, after the instrument pointer has released the shaft, by simply moving arm 78 upwardly. The cam 28 will enable the released spring 44 to slide easily overhead. The spring will snap back under shoulder 32 when the shaft 22 is at a sufficient height relative to the spring.

The instant invention provides a device wherein the translation of a very small operating force operating through high mechanical advantage can be utilized to exert a control of electrical or mechanical functions. Obviously a mechanical, as well as an electrical device or circuit, etc., can be controlled by the instant apparatus. While the meter pointer operates over the normal scale range, zero to full scale, the shaft 22 remains in the set position with the shoulder 46 of the head 26 resting on the deflection release spring 44.

The sensitivity of this device is highest when the ratio of the length of the lever force arms 64, 66 to the radius from the center of the lever bearings 48 and 50 to the points of attachment of the spring is greatest. Also the sensitivity is highest when the distance between the centers of the lever bearings is a maximum. It is further apparent that when the lever arms, or either one, are caused to turn on their respective lever bearings the normal distance between the points of connection of the ends of the deflection release spring becomes less than normal. As a result the spring must deflex. Some rotation of the unactuated arm (the one not contacted by the meter pointer) will occur, but this will not affect the operation. The amount of deflection which is illustrated in FIGURE 2 can be achieved with a very slight rotation. This is due to the very high ratio of the tangent to the secant of the angle 82 traversed by the spring at its connection to a bearing and moving between the normal and deflected positions of the spring.

While I have shown and described the preferred form of my invention, it will be understood by those skilled in the art that many changes in form and details of construction can be made within the scope of the appended claims, and I claim an exclusive right to all changes, modifications, and forms coming within the scope of the appended claims.

I claim:

1. A meter actuated control device comprising a plate, an operating shaft, a resilient means bearing against said operating shaft and said plate and urging said shaft to move relative to said plate, means normally resisting the movement of said shaft including a deflection release element engaged with said shaft, and means on such shaft cooperating with said element for normally resisting the movement of said shaft, said deflection release element extending substantially transversely of said shaft and being fixed adjacent both its ends on opposite sides of said shaft and comprising a resilient means, means connected to said opposite ends of said deflection release member adapted to be contacted by an instrument pointer for deflection of said deflection release spring out of said normal position and out of engagement with said shaft for release of the latter, said shaft constituting means adapted to initiate a control function.

2. The apparatus of claim 1 wherein said deflection release spring ends are pivotally mounted on said plate.

3. A meter actuated control device comprising a plate, a shaft extending laterally through said plate and movable with respect thereto, resilient means normally urging movement of said shaft with respect to said plate, a release member engaged with said shaft and normally resisting said movement of said shaft, said release member constituting a substantially flat resilient member normally bearing against an abutment on said shaft, said resilient release member being mounted on said plate at spaced points adjacent its ends on opposite sides of said shaft and means connected to said release member adapted to be engaged by a meter pointer for forcing said release means out of normal engagement with said shaft.

4. A meter actuated control device comprising a plate, a shaft movably connected to said plate and means normally urging movement of said shaft with respect to said plate, means normally restraining movement of said shaft with respect to said plate comprising a release member engaged with an abutment on said shaft, said release member constituting a resilient element extending laterally of said shaft, means fixedly connected to said resilient element on one side of said shaft and adapted to be engaged by a meter pointer, means on the other side of said shaft connected to said release member and mounting the latter on said plate, said means connected to the first mentioned side of said shaft being operable by a meter pointer to change the distance between said point of connection to said latter means and the means connected to said other end of said member to distort said member out of engagement with said shaft.

5. A meter actuated control device comprising a plate, a shaft movably mounted in said plate, resilient means urging said shaft to move with respect to said plate, a release spring engaged with said shaft, said shaft including means cooperating with said release spring for normally resisting movement of said shaft, said release spring being pivotally mounted adjacent its ends on opposite sides of said shaft, means connected to one of said ends of said release spring for rotating the latter end about its pivot and to distort said spring out of engagement with said shaft.

6. A switch comprising a plate, a shaft operably connected to said plate for movement with respect thereto, means resiliently urging movement of said shaft with respect to said plate, a release spring engaged with an abutment on said shaft and extending laterally thereof and normally resisting said movement, said release spring being pivotally mounted on said plate at one point on one side of said shaft and pivotally mounted on said plate at another point on the other side of said shaft, with the distance along said member between said two points of pivotal mounting being fixed, means for rotating one of the pivotal supports and the portion of said member connected thereto comprising an element adapted to be actuated by a meter pointer to change the distance between said points.

References Cited in the file of this patent
UNITED STATES PATENTS

| | | |
|---|---|---|
| 2,674,670 | Quick | Apr. 6, 1954 |
| 2,807,689 | Ray | Sept. 24, 1957 |